United States Patent [19]

Hilgers et al.

[11] 3,899,305

[45] Aug. 12, 1975

[54] INSERT FRAME FOR INSERT MOLDING

[75] Inventors: Raymond H. Hilgers, Schaumburg; James P. Liautaud, Trout Valley, both of Ill.

[73] Assignee: Capsonic Group, Inc., Elgin, Ill.

[22] Filed: July 23, 1973

[21] Appl. No.: 381,405

[52] U.S. Cl. ................................ 29/193; 29/193.5
[51] Int. Cl. ............................................. B21c 37/00
[58] Field of Search ........ 29/193.1, 193.5; 264/262, 264/272, 297, 160, 328; 161/109, 110, 111; 85/17; 206/328; 425/123; 249/97; 272/9

[56] References Cited
UNITED STATES PATENTS

| | | | |
|---|---|---|---|
| 2,273,099 | 2/1942 | Gilbert | 85/17 |
| 3,065,525 | 11/1962 | Ingraham et al. | 29/190 |
| 3,597,666 | 8/1971 | Taskovich | 29/193.5 |

*Primary Examiner*—L. Dewayne Rutledge
*Assistant Examiner*—O. F. Crutchfield

[57] ABSTRACT

An insert frame is disclosed for orienting and supporting inserts for insert molding thereof in injection molded articles. A particularly preferred embodiment is adapted for insert molding electrical leads in injection molded electronic component packages. The integral insert frame comprises a relatively strong carrier strip, barrier supports extending between respective inserts and terminating in respective barriers having readily broken shear points or bridges which extend to and are integral with the lead portions of the frame destined to become the insert leads in the package. The barriers serve as part of the mold assembly during the injection molding of the package and are maintained in desired location during high pressure molding by the barrier supports, carrier strip and location pins in the mold which mate with holes in the carrier strip. Hence, the readily broken barrier shear bridges will be positioned adjacent to the package wall after molding, and breaking forces will not adversely affect the inserts. The remaining portion of the lead frame is separated from the respective leads after molding of the package, e.g. a shell, by merely twisting down the carrier strip portion of the lead frame, thereby causing fracture of the barriers at the juncture of the respective barriers and the adjacent lead portions at the package wall, wherein the respective barriers remain attached to the separated portion of the insert frame, and the respective leads remain securely located in the injection molded package.

12 Claims, 7 Drawing Figures

3,899,305

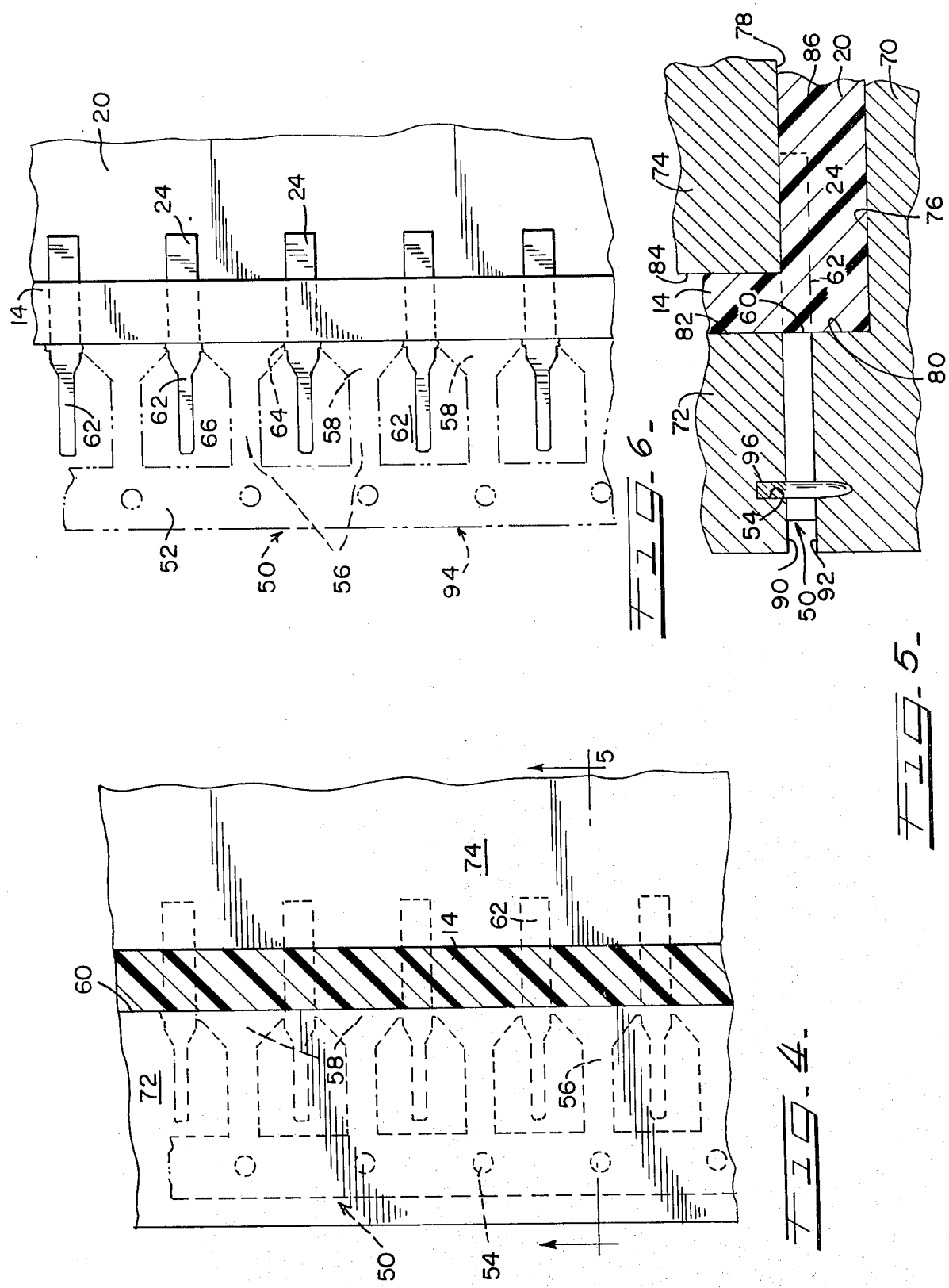

INSERT FRAME FOR INSERT MOLDING

This invention relates to insert molding generally, and it is particularly applicable to the insert molding of a plurality of electronic component leads in an injection molded electronic component package.

More particularly, this invention relates to an improved insert frame, such as, for example, an improved lead frame.

The art of insert molding electrical leads in electronic component packages is highly developed. Examples of patents wherein electrical leads are insert molded in injection molded packages in a method which utilizes a lead frame include the following:

U.S. Pat. No. 3,391,426, issued July 9, 1968 to J. R. Hugill;
No. 3,341,092, issued Mar. 4, 1969 to W. L. Lehner;
No. 3,539,675, issued Nov. 10, 1971 to J. R. Hugill;
No. 3,574,815, issued Apr. 13, 1971 to E. E. Segerson;
No. 3,606,673, issued Sept. 21, 1971 to J. H. Overman;
No. 3,611,061, issued Oct. 5, 1971 to E. E. Segerson.

Heretofore, it has been customary to support a plurality of electrical leads for insert molding by providing such leads as a portion of a lead frame having the general character of an elongated strip which is formed by stamping, and comprising a longitudinally extending mounting portion, a plurality of leads extending transversely from said mounting portion, wherein the individual leads are maintained in spaced-apart condition by a second longitudinally extending member such as a tie strip. In some of the aforementioned patents, the longitudinally extending tie strip or barrier strip serves as a portion of the mold used to form the article in which the lead is to be located. In each of the heretofore available methods and apparatus, it was necessary to shear the tie strip, or barrier strip in two places between the respective electrical leads, and to shear the electrical leads at the carrier strip to separate the carrier strip from the individual leads.

It must be appreciated that in many instances, the injection molding operations involve relatively tiny electronic component packages having an overall greatest dimension in the general order of magnitude of one-half inch to one inch, for example, and the process of shearing the barrier strips, as well as shearing the leads from the carrier strip, involved very expensive, high precision equipment, and the risk of damage to individual articles was relatively high. Moreover, such shearing processes produced one tiny tie strip or barrier fragment from between each pair of adjacent electrical leads, and the fragments presented a collection and handling nuisance. Also produced as a consequence of the shearing operation was the residual elongated carrier strip portion of the lead frame.

To facilitate the cutting of the barrier strip, the barriers used heretofore have been very narrow, generally speaking, and this created a tendency, under high molding pressure, for the barriers to buckle or otherwise deform, resulting in a misshaped molded article. In some instances the barriers would break under the pressure permitting plastic to flow out of the mold cavity resulting in production of an unusable part or possible interruption of production.

It is an object of the present invention to provide a lead frame of improved design wherein the need for a separate operation for shearing the barrier strips or tie strips, and an operation for shearing the leads from the carrier strip is eliminated.

It is another object of the present invention to provide a lead frame and method of manufacture wherein the separated barriers or strip portions of the lead frame remain attached to the carrier strip of the lead frame after separation thereof from the respective electrical leads.

It is another object of the present invention to provide an insert frame and the method of manufacture wherein the inserts are supported and properly positioned by means of an insert frame, and wherein it is unnecessary to cut the frame between the respective inserts, such as leads, for example, in order to separate the inserts from a mounting portion of the insert frame, and wherein it is unnecessary to shear barriers or tie strips from between the respective inserts.

It is a further object of the invention to provide an insert frame and method of manufacture wherein inserts are insert molded in injection molded plastic articles and are separated from an insert frame by flexing a portion of the insert frame thereby separating those elements of the insert frame which supported and maintained the inserts and whereby all non-insert portions remain integrally attached to the remaining portion of the separated insert frame.

It is a further object of this invention to provide support to the barrier strip between inserts during the molding process wherein that molding process can be done under very high pressure. It is another object of a preferred embodiment of this invention to provide an extension of the barrier strip wherein that extension is directly connected to the carrier strip and that carrier strip is securely located in the mold by hole guides provided in that mold.

It is a further object of the preferred embodiment of the present invention to provide support for the barriers at the mid-portions thereof in such a way that the mid-portion of the barriers are supported by the carrier strip and ultimately prevented from shifting in position in the operating plane by the hole guides in the mold which index or locate the carrier strip.

These and other objects are all achieved in accordance with the present invention which will be described hereinafter in connection with particularly preferred embodiments, and with the aid of the accompanying drawings in which:

FIG. 4 is a horizontal cross-sectional view taken through a mold system in which the lead frame of the present invention is used.

FIG. 5 is a cross-sectional elevational view taken approximately along the line 5—5 of FIG. 4.

FIG. 6 is a greatly enlarged top plan view of an electronic component package produced in accordance with the present invention.

Figure 1:
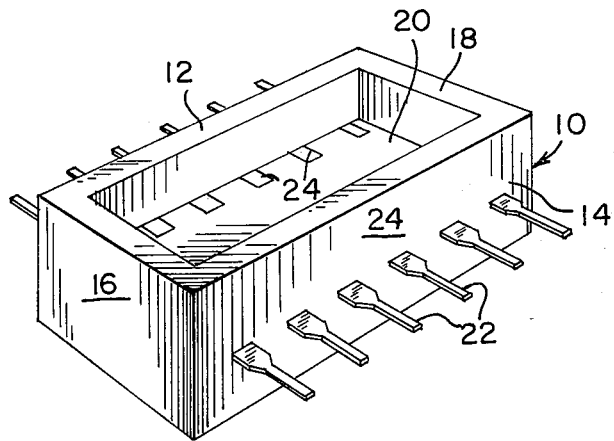
FIG. 1 is a perspective view of an electronic component package of the type which is produced in accordance with the present invention.

Referring now to the drawings, a bottom portion of an electronic component package is indicated generally by the numeral 10. The package is elongated, having elongated side walls 12, 14, end walls 16, 18, and bottom 20. A plurality of electrical leads 22, 22 extend through side walls 12, and 14, and are embedded in bottom 20 with upper surfaces 24, 24 exposed to the interior of the package. In the heretofore available art, it has been conventional to produce such electronic component enclosures 10 by using a heretofore conventional lead frame 30 having an indexing and mounting portion which is also referred to herein as carrier strip 32 which extends longitudinally along one edge of lead frame 30 and has uniformly spaced-apart indexing apertures 34 passing therethrough. Extending from one edge 36 of mounting portion 32 are a plurality of lead portions 38, 38 having barrier strips 40, 40 integral therewith and extending therebetween. It was customary to provide lead frame 30 as an integral stamped elongated strip, and to associate lead frame 30 with a molding system in which barrier strips 40 are positioned between upper and lower mold halves with edges 42, 42 being aligned with the inner package-forming surfaces of the mold.

Figure 2:
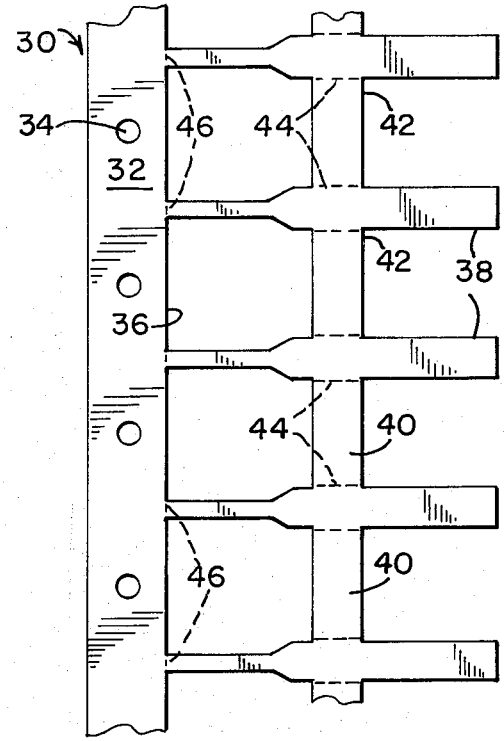
FIG. 2 is a greatly enlarged top plan view of a lead frame of conventional design not in accordance with the present invention.

It is to be understood that the molds which are used in conjunction with the insert frame, such as, for example, with lead frame 50 which is in accordance with the present invention, is of the conventional type which is used in connection with the lead frame 30 shown in FIG. 2. Consequently, except for the indications of the mold structures in FIGS. 4 and 5 herein, the design and construction of the molds will not be discussed in great detail herein, inasmuch as such molds are conventional.

After the plastic is injected into the cavity of mold system, and the molded parts 10 are formed with insert 30 insert-molded therein, the outer surface 24 is flush with edges 42, 42 of barrier strips 40, 40. Consequently, since leads 38, 38 must be isolated with respect to one another in order that their function as independent electrical leads can be achieved, barrier strips 40, 40 must be sheared along lines 44, 44 to remove tie strips 40, and carrier strip 32 is severed from lead portions 38, 38 by shearing the lead frame 30 along lines 46, 46.

Thereafter, individual leads 38, 38 remain imbedded in a wall 12, 14 of an enclosure 10 and are no longer electrically connected. It is noted, however, that individual segments 40, 40 become separated, and must be handled separately from the now severed mounting portion 32 of lead frame 30.

It is emphasized that the insert molding of leads in packages is discussed for illustrative purposes only, and that the invention is not limited thereto. The invention is directed to the molding of inserts into articles generally. However, the molding of electrical inserts such as a lead into an article such as a package is a particularly advantageous application of the invention and is therefore an apt subject for illustration of the invention.

In accordance with the present invention, all the necessary positioning, and supporting functions of lead frame 30 are retained but are enhanced, and the function of edge 42 as part of the plastic-forming mold surface is also retained and enhanced. However, in accordance with the present invention, it is no longer necessary to execute the extremely delicate and precise shearing steps which were an essential part of the prior art practice.

In accordance with the present invention, lead frame 50 includes an elongated marginal mounting portion identified as carrier strip 52 having uniformly spaced-apart indexing apertures 54, 54, and having spaced-apart barrier supports 56, 56 extending transversely therefrom. Barrier supports 56, 56 terminate at the other end thereof in barrier portions 58, 58 and it will be appreciated from the consideration of FIG. 3 that the lateral extreme edges 60, 60 of barriers 58, 58 are aligned. Barriers 58, 58 extend substantially the entire distance between respective lead portions 62, 62 and are connected at either side thereof to adjacent lead portions 62, 62 by narrow frangible bridges 64, 66 at the right side and left side thereof, respectively, facing away from mounting portion 52.

The width of bridges 64, 64, 66, 66 is extremely narrow such as, for example, 0.005 inch, and, in accordance with the present invention, is that width, depending on the thickness and strength of the material from which lead frame 50 is fabricated, wherein bridges 64, 64, 66, 66 can be readily broken by pivoting respective barrier supports 56, around an imaginary axis extending between respective bridging portions 64, 66.

A consideration of FIGS. 4, 5, and 6 will assist in understanding the operation of lead frame 50, in accordance with the method of the present invention. As illustrated in FIGS. 4, 5, and 6, lead frame 50 is confined between a lower mold element 70 and a pair of upper molded elements 72, 74. Horizontal surface 76 defines the surface of bottom 20 of enclosure 10. Surface 78 defines the top surface of bottom 20, and engages the upper surface 24 of lead portion 62. Surface 80 of mold portion 70 cooperates with edge 60 of lead frame 50 and surface 82 to define the plastic forming surface which shapes the exterior of wall 14. Surface 84 of mold portion 74 defines the inner surface of wall 14.

Thus, when a plastic material 86 is injected under very high pressure into the mold cavity, plastic material 86 flows through the space between surfaces 76, 78, and through the space between surfaces 82, 84 to provide bottom 20 and walls 12, 14 with extending portions 63 of leads 62 embedded in bottom 20 and extending through walls 12, 14. Barriers 58, 58 and bridging portions 64, 66, thereof thus provide aligned surfaces 60, 60 within the mold cavity to serve as a portion of the mold used to shape the plastic article and embed the metal insert elements therein in accordance with this invention.

Figure 7:
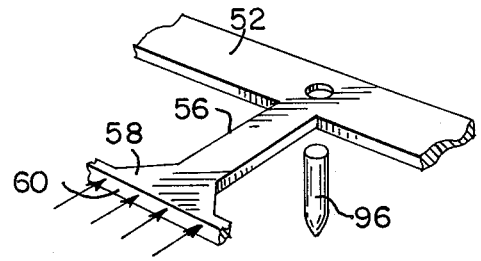
FIG. 7 is an enlarged schematic fragmentary exploded perspective view illustrating the support provided for the barrier when it is under pressure during molding.

Lead frame 50 is produced, for example, as a stamping from an elongated strip of metal of uniform thickness. Such strips are typically made from a material which is relatively soft compared to the material forming the mold, and when mold faces 90, 92 are closed against lead frame 50, a slight deformation takes place. This deformation results in a more intimate contact and seal than would be expected with mating machines and surfaces. Moreover, the closing of faces 90, 92 causes molds 70, 72 to grip barrier portions 58, 58 therebetween, thus assisting in the stabilizing and securing of the position of bridging portions 58 and alignment with surfaces 80, 82 on mold 70, 72 respectively. However, as illustrated in FIG. 7, herein, the pressure of the plastic being molded under very high pressure is exerted against barrier edge or face 60 and would tend to deform or break barrier 58. However, in accordance with this invention the barrier 58 is supported by barrier support 56 which extends between barrier 58 and carrier strip 52 and is integral with and is coplanar with these portions of insert frame 50. In accordance with the illustrated preferred embodiment indexing holes 54 are positioned, or located, by the inserting therethrough respective carrier strip locating pins 96 which are secured in one of the mold elements. By sizing holes 54 and pins 96 whereby pins 96 are closely received in holes 54 when the mold is closed with insert frame 50 therebetween, the frame 50 is further immobilized with respect to shifting during molding. More importantly, however, and in accordance with the present invention, pins 96 anchor carrier strip 52, respective barrier supports 56, and barriers 58 against planar shifting under pressure, thus providing ample support for securely maintaining plastic-conforming edge 60 in position during high pressure molding, and thereby eliminating the risk of distortion or fracture of barriers 58 due to the pressure of the plastic being molded.

As a consequence, in spite of the relatively high plastic pressures which are normally encountered within the mold cavity, barriers 58, 58, including frangible bridging portions 64, 66 reliably seal the plastic-forming cavity. FIG. 6 illustrates the condition of the molded part after the non-insert portion of lead frame 50 has been removed. Lead portions 62 extend through side wall 14 and are embedded in bottom 20 with the upper surfaces 24 of lead 62 exposed. Non-insert portion 9 of lead frame 50 is removed in one piece from the insert-molded article by pivoting the non-insert portion 94 of the lead frame consisting of marginal elongated carrier strip portion 52, barrier supports 56, 56, and barriers 58, 58 around an imaginary axis drawn through frangible bridging portions 64, 66. Because of the thinness of the sheet from which lead frame 50 is fabricated, and because of the narrow width of bridging portions 64, 66, the bridging portions are readily frangible, and will fail, that is, will break, as a consequence of the pivoting of the lead frame 50, as indicated above. In some extreme cases lead frame 50 may have to be pivotally reciprocated to induce failure. Immediately upon the fracture of bridging portions 64, 66, lead portions 62, 62 are completely separated from the remaining portion 94 of lead frame 50.

Moreover, it will be apparent from consideration of the remaining portion 94 that the separated elements remain intact, wherein barrier portions 58, 58 remain attached to barrier support portions 56, 56, and hence to elongated marginal carrier strip portion 52.

Leads 62, 62 will have extremely tiny vestiges of barrier portions 64, 66 at the wall 24, but these vestiges in no way affect the quality of the resulting product. In fact, depending on the size of bridging portions, 64, 66, these vestiges tend to be smaller than those observed remaining after shearing of tie strips 40 in accordance with prior art practices of cutting unsupported tie strips.

Also, in accordance with the method of the present invention, it is apparent that the complex delicate high precision shearing steps heretofore required are no longer necessary, and that the separated portion 94 of lead frame 50 remains completely intact eliminating the nuisance of handling separated fragmented tie strips 40.

Figure 3:
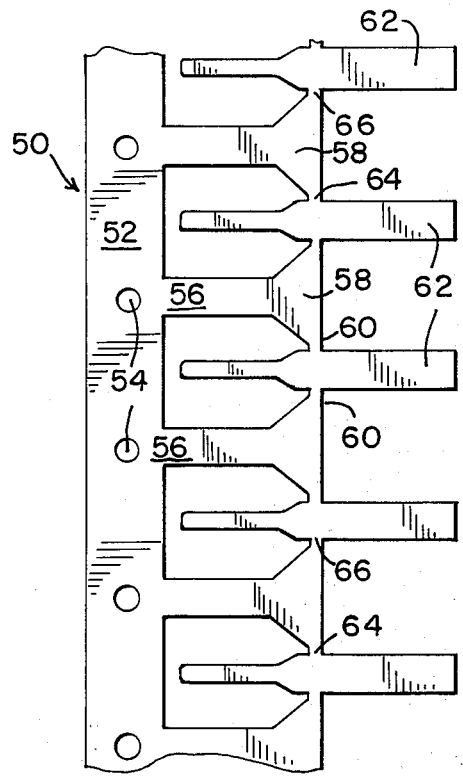
FIG. 3 is a top plan view of a lead frame in accordance with the present invention.

It is contemplated, in accordance with the present invention, that insert frame 50 can be used for the insert molding of components other than electrical leads. However, it is essential, in accordance with the present invention, that the insert corresponding to lead portion 62 be attached to the insert frame 50 only through thin frangible bridging portions 64, 66 respectively, and that barriers 58 be supported directly by respective barrier supports which extend from and are coplanar with the carrier strip portion 52. It is believed perfectly clear that in accordance with the present invention, as illustrated in FIG. 3, that the inserts, such as electrical leads 62, 62 are not otherwise connected to the remaining portions 94 of lead frame 50, except through readily frangible bridges 64, 64 adjacent to the molded article, e.g. adjacent to the walls 12, 14.

The preferred embodiments discussed herein are for the purpose of illustration and not for the purpose of limitation. It will be apparent to those skilled in the art that any variations and modifications can be employed without departing from the spirit and scope of the present invention.

For example, it is not essential that the line formed by barrier edges 60 be in a straight line, and it need not be parallel to elongated carrier strip portion 52. Quite to the contrary, it could be curvilinear, either concave or convex with respect to the view from the imbedded lead.

No part of the barrier 58 should extend into the plastic-receiving cavity within the mold system; that is, that no part of the barrier 58 should extend past surfaces 82, and 80, since this would cause barrier 58 to become embedded within side wall 14. Nonetheless, it is not essential that the line of edges 60 be straight, and, should line of edges 60 be convex with respect to the view from the imbedded lead, it is only necessary that the apex of the curvilinear edge 60 extend no further than surfaces 82, 80. In the resulting article, plastic will, of course, pass between surfaces 90, and 92 of the molds, and encounter the edges 60, 60 providing plastic barriers at either side of leads 62, 62. It is only essential that the readily frangible bridging portions 64, 66, be the only support for the leads 62, 62 in the insert frame 50.

Should edges 60, 60 be positioned to form a recess in the plastic shaping cavity of the mold system, plastic 86 will flow between surfaces 90, 92 to provide a rib extending between leads 62, 62. However, it is preferred that bridges 64, 66 be positioned in the mold adjacent surfaces 80, 82 so that they are immediately adjacent surface 24, for example, in wall 14 prior to their fracture. This provides maximum support for leads 62, 62 during twisting off of removed frame portion 90, with minimum likelihood of distortion of leads 62, 62 in the process.

We claim:

1. An integral insert frame for use in molding a plurality of terminals into the wall of an injection molded housing, said frame comprising, in combination:

a plurality of elongated spaced-apart terminal portions arranged for insertion at spaced locations through said wall;

a plurality of barrier portions extending between adjacent ones of said terminal portions and attached thereto by means of frangible bridging portions; and means including a carrier portion attached only to each of said barrier portions for maintaining said barrier portions in fixed spatial relationship whereby said terminal portions are aligned for insertion into said housing wall.

2. An integral insert frame as defined in claim 1 wherein said carrier portion includes indexing means for maintaining said integral insert frame in accurate alignment with respect to said injection molded housing.

3. An integral insert frame as defined in claim 2 wherein said indexing means comprise a plurality of apertures in said carrier portion for receiving alignment pins fixed with respect to the mold forming said injection molded housing.

4. An integral insert frame as defined in claim 1 wherein said frame is formed from a sheet of metallic material, said terminal portions comprise strips of said material aligned in a single plane, said barrier portions extend between adjacent edges of said terminal portions and include projecting portions extending away from said wall beyond the distal ends of said terminal portions to said carrier portion.

5. An integral insert frame as defined in claim 4 wherein said wall is substantially flat, said terminal portions are parallel and extend perpendicularly from said wall, and said barrier portions connect with said terminal portions at locations adjacent the outside surface of said wall.

6. An integral insert frame as defined in claim 1 wherein each of said barrier portions includes a barrier-forming edge extending parallel to and adjacent to said wall to assist in maintaining said terminal portions in alignment.

7. An integral insert frame as defined in claim 6 wherein said barrier portions include projecting portions extending perpendicularly to said housing wall and connecting with said carrier portion at locations beyond the distal ends of said terminal portions.

8. An integral insert frame as defined in claim 7 wherein said barrier portions connect with said terminal portions at locations adjacent the surface of said wall and said barrier-forming edge extends between said locations.

9. An integral insert frame as defined in claim 8 wherein said housing wall is substantially flat, said terminal portions are parallel and extend perpendicularly from said wall, and said carrier portion comprises an elongated strip connecting with said projecting portions.

10. An integral insert frame as defined in claim 1 wherein said bridging portions are dimensioned with respect to said terminal, barrier and carrier portions so as to constitute the most frangible portion of said frame.

11. An integral insert frame for use in molding a plurality of terminals into the wall of an adjacent molded housing, said frame comprising, in combination:

a plurality of elongated spaced-apart terminal portions arranged for insertion at spaced locations through said wall;

a plurality of barrier portions extending between adjacent ones of said terminal portions and attached thereto by means of frangible bridging portions, said barrier portions including projecting portions extending perpendicularly to said wall and a barrier-forming edge extending parallel to and adjacent to said wall to assist in maintaining said terminal portions in alignment; and means including a carrier portion attached only to said projecting portions for maintaining said barrier portions in a fixed spatial relationship whereby said terminal portions are aligned for insertion into said housing wall.

12. An integral insert frame as defined in claim 11 wherein said barrier portions are attached to said terminal portions at locations adjacent said wall.

* * * * *